United States Patent [19]
Schneckenburger

[11] Patent Number: 6,095,029
[45] Date of Patent: Aug. 1, 2000

[54] METHOD FOR SUPPLYING A DEVICE OR SYSTEM WITH AN ALTERNATING, PULSATING, OR CYCLIC FLOW OF POWER OR ENERGY

[75] Inventor: Reinhold Schneckenburger, Fellbach, Germany

[73] Assignee: DaimlerChrysler AG, Stuttgart, Germany

[21] Appl. No.: 08/992,394

[22] Filed: Dec. 17, 1997

Related U.S. Application Data

[63] Continuation of application No. 08/561,622, Nov. 21, 1995.

[30] Foreign Application Priority Data

Nov. 21, 1994 [DE] Germany .............................. 44 41 364

[51] Int. Cl.[7] .................................................... F15B 13/044
[52] U.S. Cl. ............................................... 91/459; 60/459
[58] Field of Search ............................ 60/459; 91/361, 91/459

[56] References Cited

U.S. PATENT DOCUMENTS 4,453,378  6/1984  Zagranski et al. .
4,813,339  3/1989  Uno et al. ............................ 91/459
5,208,784  5/1993  Laukien .
5,363,450  11/1994  Moody et al. ...................... 381/71.5

FOREIGN PATENT DOCUMENTS 35 39 558 A1  of 1987  Germany .
39 12 706 A1  of 1990  Germany .
WO 91/03863  of 1991  WIPO .

OTHER PUBLICATIONS

F. Blaabjerg et al, "Optimized and Non–Optimized Random Modulation Techniques for VSI Drives", 1995.

*Primary Examiner*—Edward K. Look
*Assistant Examiner*—Thomas E. Lazo
*Attorney, Agent, or Firm*—Evenson, McKeown, Edwards & Lenahan, P.L.L.C.

[57]   ABSTRACT

The invention relates to a method for supplying a device or system with a pulsating or cyclic flow of power or energy that alternates in the manner of a noise, with the noise having a spectral amplitude or intensity distribution that is essentially the inverse of the amplitude frequency pattern of a noise parameter of the device or system so that low-noise transmission of power or energy is made possible.

15 Claims, 4 Drawing Sheets

METHOD FOR SUPPLYING A DEVICE OR SYSTEM WITH AN ALTERNATING, PULSATING, OR CYCLIC FLOW OF POWER OR ENERGY

This application is a continuation of application Ser. No. 08/561,622, filed Nov. 21, 1995.

BACKGROUND AND SUMMARY OF THE INVENTION

The invention relates to a method for generating a stochastically alternating, pulsating, or cyclic flow of power or energy, for application to a power consuming device. This flow of power or energy can also be superimposed on another flow of power or energy.

In electrical machines, transformers, throttle coils, and capacitors that use cyclic power-electronic devices, German patent document DE 35 399 558 C2 teaches varying or sweeping the cyclic frequency at least in a specified frequency range in order to avoid undesirable emission of noise or electromagnetic noise spectra, especially when these systems and devices are located in a common chamber or body that can vibrate. By varying the cyclic frequency, the risk of excitation of the walls of the chamber or body by resonance can be significantly reduced, so that only insignificant noise is radiated, if any.

In an especially preferred arrangement, German patent document DE 35 39 558 C2 teaches the adaption of measures to detect the respective ambient conditions. In particular, other ambient noises are measured and analyzed, and the resultant spectral analysis is used to influence the variation of the frequency. In this manner, the noise emission has approximately the same spectrum as the background noise in the environment. As a result, the noises generated by the system or the individual device have a sound similar to the general background noise.

The swept cyclic frequency can be produced by connecting a noise generator through a lowpass filter and a voltage limiter that determines the frequency deviation to one input of an adder, whose second input is connected with a fixed voltage source that supplies the center frequency. A voltage-frequency converter is connected to the output of the adder so that the swept cyclic frequency can be tapped at the output of the converter. Alternatively, it is also possible to connect a random number generator and a fixed number generator having a larger bit number than the random number generator to separate inputs of an adder. The output of the adder influences a counter connected with a fixed-voltage generator that determines the counting limit, and the counter overflow of the counter on the output side corresponds to the swept cyclic frequency. The random number generator can be controlled as a function of a circuit for noise analysis.

The swept frequency produced in this manner is conducted as a cyclic frequency to devices and machines.

For controlling electrical positioning elements of proportional valves and the like, it is known to modulate the control signal with a higher frequency in order to cause the control element to perform a certain "chattering movement." As a result, although the influence of adhesive friction on the actuation of the control element can thus be reduced or eliminated, undesirable noises can develop.

The goal of the invention is to provide an improved method for supplying stochastically pulsating power to a power consuming device especially for electrohydraulic applications, specifically the supply of electric current to electromagnetic positioning elements of proportional valves.

This goal is achieved according to the invention by virtue of the fact that a noise signal that is superimposed on the power signal has a spectral amplitude or intensity distribution that is essentially the inverse of the amplitude frequency pattern of a noise parameter of the device or system. That is, the invention is based on the general idea of increasing the intensity of the noise in those frequency ranges in which the danger of disturbing resonant excitations is especially low (noise sensitive frequency ranges, as shown in FIG. 4) or which are located relatively far from resonant frequencies. Since the transmission of power or energy according to the invention is greater in those frequency ranges in which vibrations with only low amplitudes can be excited, an especially low-noise operation is made possible.

Other objects, advantages and novel features of the present invention will become apparent from the following detailed description of the invention when considered in conjunction with the accompanying drawings.

DETAILED DESCRIPTION OF THE DRAWINGS

Figure 1:
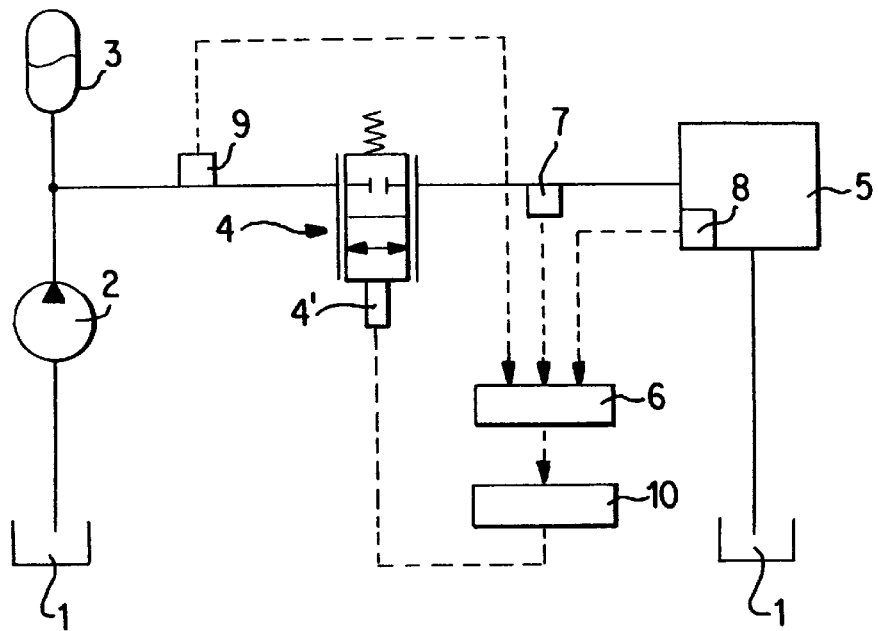
FIG. 1 is a schematic diagram of a hydraulic system which incorporates the stochastically pulsating power generating system according to the invention.

FIG. 1 shows a schematic diagram of a hydraulic system which has a proportional valve arranged in the supply line of a power consuming device, with the electromagnetic control element of the valve being provided with electric current in the manner according to the invention. More particularly, a pressure pump 2 is connected to its intake side with a hydraulic reservoir 1, and a pressure reservoir 3 located on the output side of pump 2 is connected through an electromagnetically controlled proportional valve 4 with a power consuming device 5. Hydraulic medium from the consuming device 5 flows back to reservoir 1, possibly through an additional proportional valve (not shown).

The proportional valve 5 is controlled by an electronic regulator 6, which is connected at its input with a pressure sensor 7. The electronic regulator 6 receives signals from the sensor 7 that reproduce the hydraulic pressure on the input side of the power consuming device 5. In addition or alternatively, an input to the regulator 6 is connected with a sensor 8, that generates signals that reproduce the operating state of the power consuming device 5. It is also possible for proportional valve 4 to have another pressure sensor 9, located on the input side and connected with the input side of regulator 6, so that signals that represent the pressure upstream of proportional valve 4 are also available for regulation.

The output of regulator 6 controls a driver circuit 10, which in turn provides the electromagnetic positioning assembly 4' of proportional valve 4 with electric current so that the proportional valve 4 assumes the position "desired" by regulator 6, especially an intermediate position between the completely closed state and the completely open state.

Figure 5A:
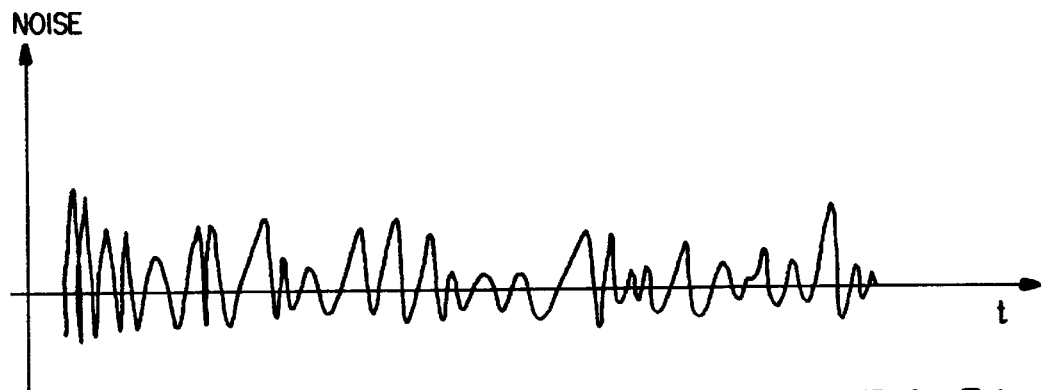
FIGS 5A–5C illustrate the superimposing of a noise signal on an intended pulse width modulated signal.
Figure 5B:
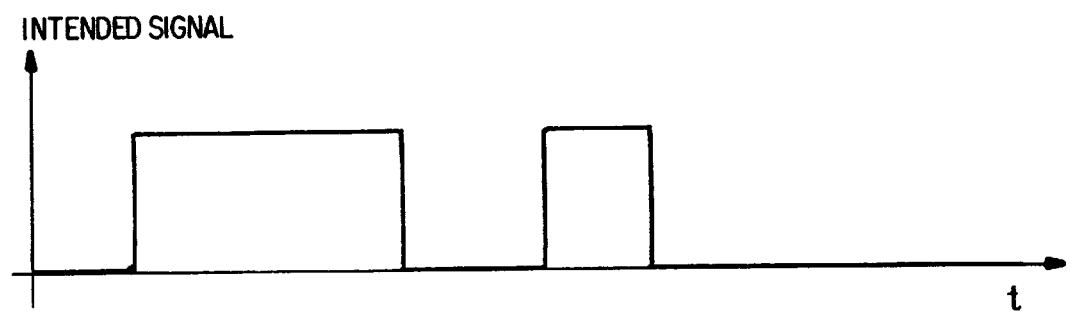
Figure 5C:
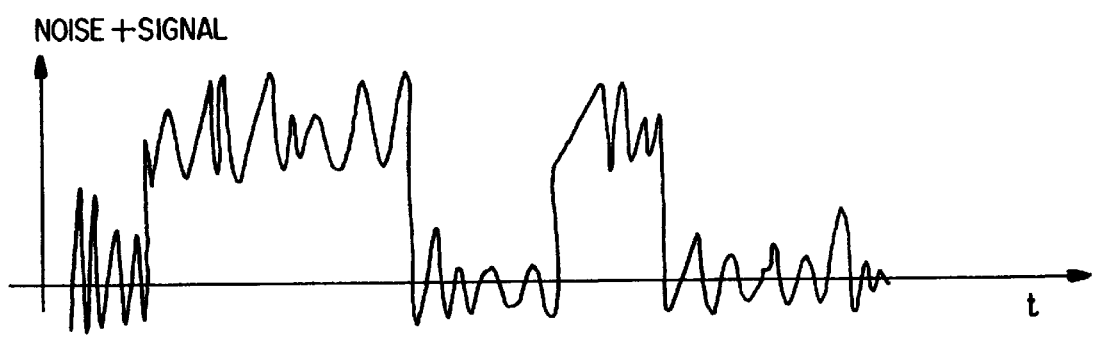

According to the invention, the electric current supplied to positioning assembly 4' is alternating and/or pulsating or cyclic, possibly being superimposed on another control current. FIG. 5A, for example, shows such a stochastically pulsating signal, which is superimposed on a control signal shown in FIG. 5B, to provide the electric current (FIG. 5C) which is supplied to the positioning assembly 4. The amplitude, pulsation or cyclic frequency and/or the pulse width alternate in the manner of noise whose spectral intensity distribution is essentially the inverse of the amplitude-frequency pattern of a noise spectrum or noise parameter of proportional valve 4 or of the hydraulic system shown or of the mechanical structure of system parts. That is, those frequencies at which mechanical vibrations can be produced relatively easily at proportional valve 4 or in the hydraulic system are stimulated with only an especially low or vanishing intensity within the noise spectrum.

Sensors 7 to 9 may detect vibrations by frequency and intensity as well as amplitude, and supply corresponding signals to regulator 6. Accordingly, regulator 6 can control driver circuit 16 in such fashion that frequencies in the noise spectrum that are in the vicinity of frequencies of disturbing or noise-intensive vibrations in the hydraulic system are prevented.

Figure 2:
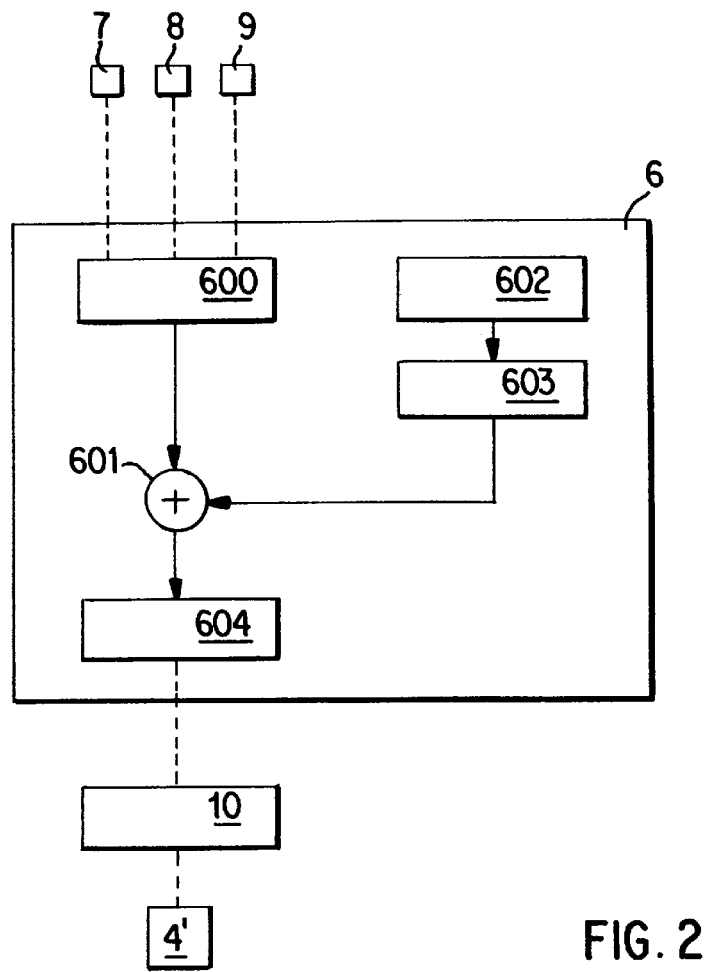
FIG. 2 is a block diagram of a first embodiment of a computer for implementing the process according to the invention.

According to FIG. 2, regulator 6 comprises a basically conventional regulating circuit 600 having an input connected with outputs of the sensors 7 to 9. Signals from these sensors are compared by the regulating circuit with values set previously or to be set. As a result of this comparison, regulating circuit 600 generates a digital signal at its output that produces the desired position of proportional valve 4 in each case (see FIG. 1). This signal is fed to an input of an adder 601.

In addition, regulator 6 includes a digital noise generator 602. That is, a noise spectrum generated at the output side of generator 602 is represented by digital signals. All the frequencies in the noise spectrum have the same intensity.

This digitally displayed noise is fed to a digital filter 603 that attenuates the various frequencies in the noise spectrum differently so that the noise spectrum at the output off filter 603 has a spectral amplitude or intensity distribution that is essentially the inverse of the amplitude frequency pattern of a noise parameter of the system shown in FIG. 1. As a result, therefore, frequencies or frequency ranges of the noise spectrum are attenuated in proportion to the degree of danger that mechanical vibrations or hydraulic pressure fluctuations at the respective frequencies will be able to create resonances in valve 4 or in the hydraulic system of FIG. 1.

The noise spectrum altered by filter 603 is supplied to another input of additional member 601 which generates signals accordingly at its output that represent a superimposition of the output signal from regulating circuit 600 on the noise spectrum from filter 603, as noted previously. This signal is supplied to a digital-analog converter 604 which outputs an analog signal that includes both a noise signal and useful signal at a level that changes by analogy with the desired position of proportional valve 4 (see FIG. 1).

The output of digital analog converter 604 is connected with driver circuit 10, which may be a conventional switching amplifier, of the Rexroth FTE 0031 type for example. Thus, a positioning signal is available that is suitable for controlling proportional valve 4 (see FIG. 1).

Figure 3:
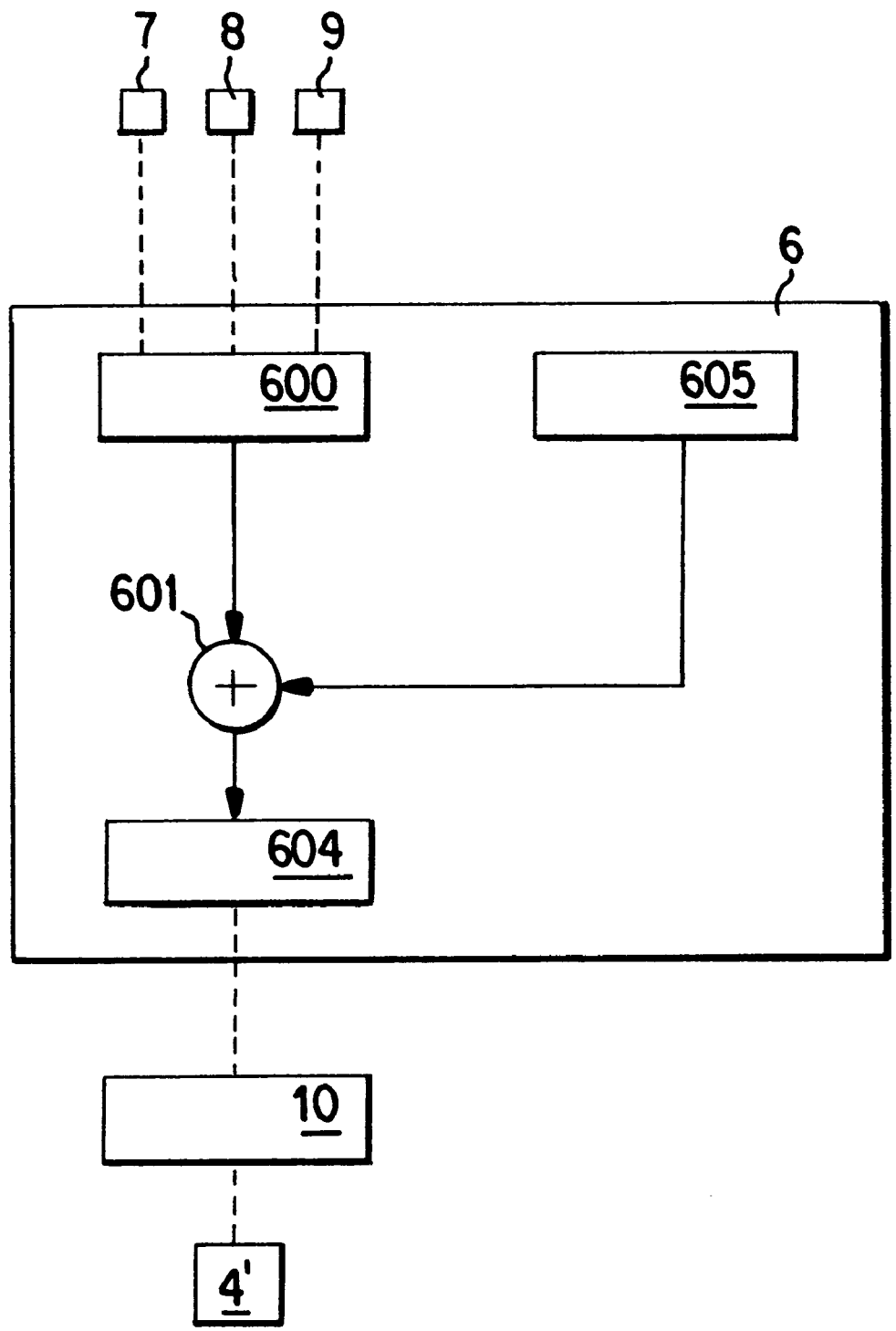
FIG. 3 is a corresponding view of a second embodiment.

The design in FIG. 3 differs from the embodiment shown in FIG. 2 only in that the noise spectrum is produced differently. In this case, the regulator comprises a memory 605 in which a number of different vibrations (sinusoidal oscillations with different frequencies for example) are stored as a noise spectrum in the form of a "table". Together with these frequencies, values are also stored for their intensities in such fashion that a noise spectrum with the desired spectral amplitude and intensity distribution are obtained. The signals provided at the output of memory 605, therefore, are similar to those found on the output side of filter 601 in FIG. 2.

Noise or noise-like-broadband signals can be generated in many different ways, for example:

by means of a pseudo-random sequence, by pulses whose pulse or clock frequencies and/or pulse widths and/or amplitudes are modulated in the manner of a noise, by an alternating signal whose frequency is constantly changed (frequency modulation), likewise independently of the current useful signal, with a frequency that depends inter alia on the useful signal amplitude when the useful signal is generated by pulse-length modulation;

by a synthetically produced signal generated on a computer for example and read out from a memory for control, said signal consisting of approximately 50 superimposed sinusoidal oscillations, whose frequencies and/or amplitudes can be predetermined if required.

Figure 4:
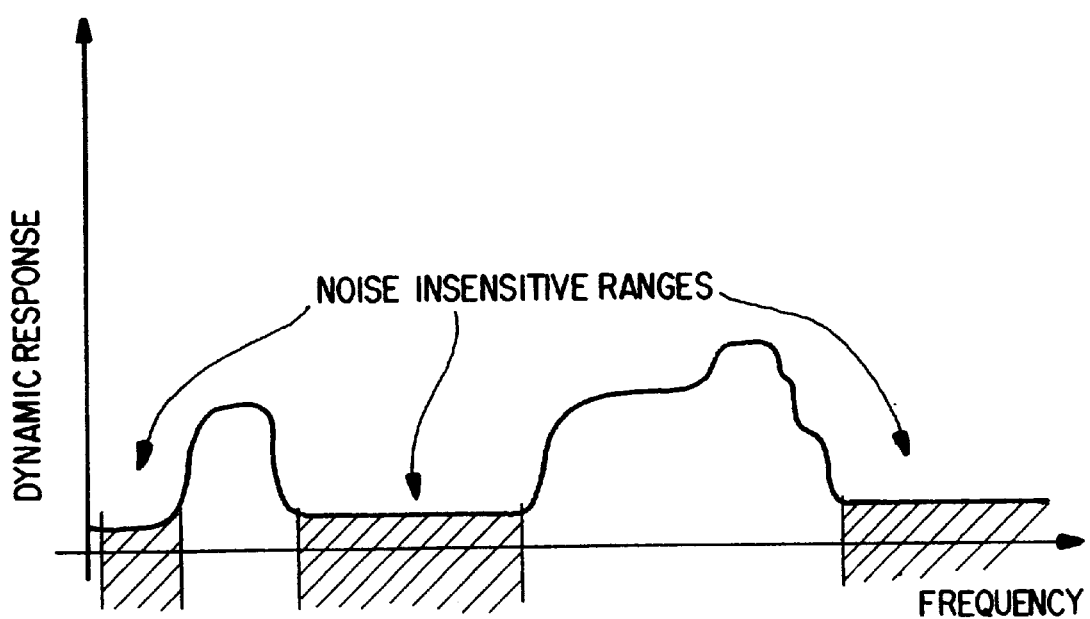
FIG. 4 is a graph which illustrates a possible amplitude frequency response of a noise parameter of a deice or system which is controlled according to the invention.

The desired spectral distribution of the noise can be produced or changed by filtering these signals, with the filters having a frequency characteristic that is the inverse of the frequency pattern of the noise parameter (as shown, for example, in FIG. 4).

The method can be modified if necessary without any significant loss of quality, by constantly changing the clock or pulse frequency of the flow of power or energy within preferred noise-insensitive frequency ranges which are shown as hatched areas in FIG. 4. It is advantageous in this connection for the various frequency ranges of the clock or pulse frequency to be used more or less frequently depending on their sensitivity to noise.

Apart from the transmission of electrical energy, the method according to the invention can also be used in conjunction with mechanical and/or fluidic transmission of power or energy.

Advantageously, the method according to the invention can also be applied to magnetic materials during demagnetization.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Method for providing a stochastically modulated power or energy flow in a power consuming system comprising the steps of:

generating a noise signal having a spectral intensity distribution which is substantially inverse to a frequency response spectrum of the power consuming system; and controlling said power or energy flow to said power consuming device as a function of said noise signal.

2. Method according to claim 1 wherein said stochastically cycled power or energy flow is at least one of alternating and pulsed.

3. Method according to claim 1 comprising the further steps of:
   detecting frequency and intensity of vibrations in said power consuming device by means of a sensor mounted thereon; and
   suppressing frequency ranges in a noise spectrum of said noise signal which are in the vicinity of a noise sensitive frequency of said power consuming system.

4. Method according to claim 1 wherein said power or energy flow in said power consuming system is modulated by the noise signal.

5. Method according to claim 1 wherein a clock or pulse frequency of the power or energy flow in said power consuming system is modulated by the noise signal.

6. Method according to claim 1 wherein the noise signal is superimposed on a pulse width modulation of the power or energy flow in said power consuming system.

7. Method according to claim 1 wherein a clock or pulse frequency of the power or energy flow in said power consuming system is varied constantly within predetermined or preferred noise-insensitive frequency ranges within the response spectrum of said power consuming system.

8. Method according to claim 1 wherein a clock or pulse frequency of the power or energy flow in said power consuming system constantly alternates, with frequency ranges used at different frequencies depending on noise sensitivity of said power consuming system.

9. Method according to claim 1 wherein the power or energy flow is superimposed on another power or energy flow.

10. Method according to claim 9 wherein said other power or energy flow comprises a current.

11. Method according to claim 1 wherein said power consuming system comprises a power source, a power consuming device and a flow control device for controlling a flow of power from said power source to said power consuming device.

12. Method according to claim 11 wherein said power consuming system is a hydraulic system and said flow control device is a proportional valve.

13. Method for suppressing resonance vibration caused by a flow of energy in an energy consuming system comprising an energy source, an energy consuming device and an energy flow regulator for controlling a flow of energy from said energy source to said energy consuming device in response to a control signal, said method comprising the steps of:
   generating a noise signal having a spectral intensity distribution which is substantially inverse to a frequency response spectrum of the power consuming system; and
   modulating said control signal as a function of said noise signal.

14. Apparatus for suppressing resonance vibration caused by a flow of energy in an energy consuming system comprising an energy source, an energy consuming device and an energy flow regulator for controlling a flow of energy from said energy source to said energy consuming device in response to a control signal, said method comprising the steps of:
   means for generating a noise signal having a spectral intensity distribution which is substantially inverse to a frequency response spectrum of the power consuming system; and
   means for modulating said control signal as a function of said noise signal.

15. An energy flow control system comprising:
   an energy source;
   an energy consuming device coupled to receive a flow of energy from said energy source;
   an energy flow regulator for controlling said flow of energy from said energy source to said energy consuming device in response to a control signal;
   means for generating a noise signal having a spectral intensity distribution which is substantially inverse to frequency response spectrum of the system; and
   means for modulating said control signal as a function of said noise signal.

* * * * *